United States Patent
Petri

(10) Patent No.: US 8,417,676 B2
(45) Date of Patent: Apr. 9, 2013

(54) AUTOMATED METHOD FOR DETECTING AND REPAIRING CONFIGURATION CONFLICTS IN A CONTENT MANAGEMENT SYSTEM

(75) Inventor: John Edward Petri, Lewiston, MN (US)

(73) Assignee: International Business Machines Corporation, Armonk, NY (US)

(*) Notice: Subject to any disclaimer, the term of this patent is extended or adjusted under 35 U.S.C. 154(b) by 542 days.

(21) Appl. No.: 11/935,825

(22) Filed: Nov. 6, 2007

(65) Prior Publication Data
US 2009/0119325 A1 May 7, 2009

(51) Int. Cl.
*G06F 7/00* (2006.01)
(52) U.S. Cl.
USPC ............ 707/694; 707/634; 707/654; 707/792
(58) Field of Classification Search .................. None
See application file for complete search history.

(56) References Cited

U.S. PATENT DOCUMENTS

| | | | | |
|---|---|---|---|---|
| 5,717,922 | A * | 2/1998 | Hohensee et al. | 1/1 |
| 6,999,966 | B2 * | 2/2006 | Liang et al. | 707/100 |
| 7,139,973 | B1 * | 11/2006 | Kirkwood et al. | 715/206 |
| 7,284,007 | B1 * | 10/2007 | Francicus de Heer et al. | 1/1 |
| 2002/0159304 | A1 * | 10/2002 | Morita et al. | 365/200 |
| 2003/0182308 | A1 * | 9/2003 | Ernst et al. | 707/103 Z |
| 2003/0200218 | A1 * | 10/2003 | Tijare et al. | 707/100 |
| 2004/0243610 | A1 * | 12/2004 | Ishiguro et al. | 707/100 |
| 2005/0203926 | A1 * | 9/2005 | Morita et al. | 707/100 |
| 2005/0203931 | A1 * | 9/2005 | Pingree et al. | 707/100 |
| 2006/0106775 | A1 * | 5/2006 | Kuhn et al. | 707/3 |
| 2006/0218180 | A1 * | 9/2006 | Bodlaender et al. | 707/103 R |
| 2007/0150433 | A1 * | 6/2007 | Chen | 707/1 |
| 2007/0174302 | A1 * | 7/2007 | Ishiguro et al. | 707/10 |
| 2008/0040397 | A1 * | 2/2008 | Herbeck et al. | 707/201 |

OTHER PUBLICATIONS

Peter H. Feiler, Configuration Management Models in Commercial Environment, Mar. 1991, Carnegie Mellon University-Software Engineering Institute, Technical Report, pp. 1-26.*

Will Provost, http://www.xml.com/pub/a/2002/04/10/beyondwxs.html, "XPath and XSLT for Validation", pp. 1-9, printed Nov. 6, 2007.

* cited by examiner

*Primary Examiner* — Mohammad S Rostami
(74) *Attorney, Agent, or Firm* — Patterson & Sheridan LLP

(57) ABSTRACT

Embodiments of the invention provide for detecting and (in at least some cases) repairing XML configuration conflicts in a content management system (CMS). One method allows a CMS to evaluate various configuration components and determine when those components may conflict with one another. If a conflict is detected, the CMS may be configured to notify an administrator of the problem, and in some cases, correct the problem. As a result, administrators may not have to carefully evaluate each configuration file associated with a document type definition for a given document type before creating or modifying a content processing rule.

15 Claims, 4 Drawing Sheets

US 8,417,676 B2

AUTOMATED METHOD FOR DETECTING AND REPAIRING CONFIGURATION CONFLICTS IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to an automated method for detecting and repairing configuration conflicts within multiple configuration files.

2. Description of the Related Art

Content management systems (CMS) allow multiple users to share information. Generally, a CMS allows users to create, modify, archive, search, and remove data objects from an organized repository. The data objects managed by a CMS may include documents, spreadsheets, database records, digital images, and digital video sequences, to name but a few. A CMS typically includes tools for document publishing, format management, revision and/or access control, along with tools for document indexing, searching, and retrieval.

An XML-aware CMS, such as IBM Solution for Compliance in a Regulated Environment (SCORE), may provide the users with a variety of advantages, for example:
- structured authoring—the ability to incorporate metadata that is normally lost in conventional formats
- repurposing of data—the ability to share fragments of data or to transform the data into different formats
- publishing—the ability to have "single source publishing" using XML stylesheets (e.g. XSLT) that separate content from presentation
- interoperability—the ability to utilize XML data across different systems or applications
- intelligent storage—the ability to synchronize XML content with attributes in the CMS Because of these, and other advantages, XML is growing in popularity as the preferred format for authoring and publishing (e.g. for Web page authoring/publishing).

Content management systems are becoming increasingly flexible and intelligent. Unfortunately, this increased level of flexibility and intelligence comes with increased configuration effort by system administrators.

SUMMARY OF THE INVENTION

One embodiment of the invention includes a method for detecting configuration conflicts between related configuration files in a content management system. The method may generally include, receiving a content processing rule to be applied to one or more documents managed by the CMS. The content processing rule may reference at least one document attribute. The method may also include determining that the attribute is a member of a repeating attribute group specified by a document type configuration associated with a document type. Further, the repeating attribute group specifies a plurality of document attributes that should occur with the same number of values in instances of the document type and the repeating attribute group includes the document attribute referenced by the content processing rule. Upon determining that, when applied to a first instance of the document type, the content processing rule could modify the first instance of the document type to include a differing number of values for the plurality of attributes for specified in the repeating attribute group, a system administrator may be notified of the detected conflict.

In a particular embodiment, the configuration set may provide a collection of XML artifacts, such as of an XML schema, document type definition (DTD), XML stylesheet, or XSLT transform. Further, the document processing rule may provide a synchronization rule specifying metadata maintained by the CMS to synchronize with metadata contained in documents of the document type, whenever documents of the document type are stored in the CMS. Further still, in addition to notifying the system administrator, the method may also include generating an external schema validation rule configured to ensure that a number of occurrences for the plurality of document attributes match one another, as specified by the repeating attribute group and accepting the received content processing rule. Of course, alternatively, the CMS may simply reject the processing rule upon detecting the conflict.

Another embodiment of the invention includes a computer-readable storage medium containing a program which, when executed, performs an operation for detecting configuration conflicts between related configuration files in a content management system The operation may generally include receiving a content processing rule to be applied to one or more documents managed by the CMS. The content processing rule may reference at least one document attribute. The operation may also include determining that the attribute is a member of a repeating attribute group specified by a document type configuration associated with a document type. The repeating attribute group specifies a plurality of document attributes that should occur with the same number of values in instances of the document type and the repeating attribute group includes the document attribute referenced by the content processing rule. Upon determining that, when applied to a first instance of the document type, the content processing rule could modify the first instance of the document type to include a differing number of values for the plurality of attributes for specified in the repeating attribute group, a system administrator may be notified of the detected conflict.

Still another embodiment of the invention includes a system having a processor and a memory containing a content management system program configured to detect configuration conflicts between related configuration files. The program may be generally configured to receive a content processing rule to be applied to one or more documents managed by the CMS. The content processing rule references at least one document attribute. The program may be further configured to determine that the attribute is a member of a repeating attribute group specified by a document type configuration associated with a document type. The repeating attribute group specifies a plurality of document attributes that should occur with the same number of values in instances of the document type and the repeating attribute group includes the document attribute referenced by the content processing rule. Upon determining that, when applied to a first instance of the document type, the content processing rule could modify the first instance of the document type to include a differing number of values for the plurality of attributes for specified in the repeating attribute group, the program may be configured to notify a system administrator of the detected conflict.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
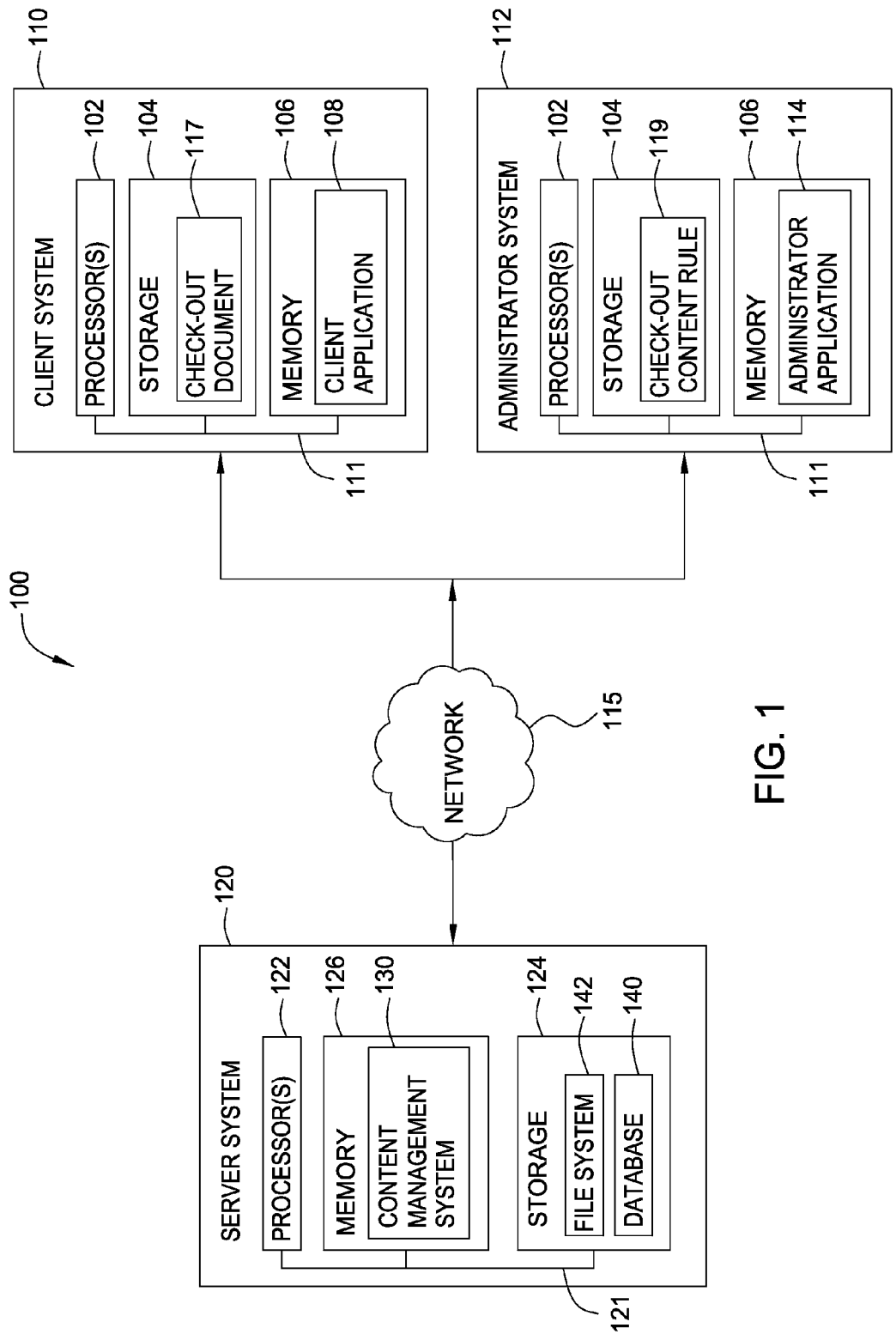
FIG. 1 is a block diagram illustrating a computing environment and content management system (CMS), according to one embodiment of the invention.

Embodiments of the invention provide a method for detecting and repairing XML configuration conflicts in a content management system (CMS). Such conflicts may arise, for example, due to various configuration components provided by a CMS. For example, in one embodiment, a CMS system is provided which allows users to compose synchronization rules used to synchronize content directly from a document (e.g., document metadata such as an XML attribute value) with data managed by the CMS (e.g., information stored by the CMS related to the documents it manages). Such synchronization rules may operate in either direction (e.g., from the document to CMS attributes or from CMS attributes to a document). Additionally, a document may be associated with a group of configuration artifacts (e.g., an XML schema, DTD, stylesheets, XSLTs, etc), collectively referred to as a configuration set. Further, CMS systems allow users to define CMS document type configurations for documents managed by the CMS. While clearly useful, this flexibility is often difficult to manage. For example, conflicts may develop between a synchronization rule used to process a document, a configuration set, and CMS document type definitions.

In one embodiment, a method allows a CMS to evaluate various configuration components and accurately determine when those components may conflict with one another. If a conflict is detected, the CMS may be configured to notify an administrator of the problem, and in some cases, correct the problem. As a result, administrators may not have to carefully evaluate each configuration file associated with a document type definition for a given document type before creating or modifying a content processing rule.

For example, some CMS systems allow users to compose processing rules to synchronize attributes or content stored in a document directly with attributes about the documents managed by the CMS. A synchronization rule could specify that a CMS attribute (i.e., information maintained by the CMS) specifying a version or state (e.g., draft, final, approved, etc.) for a given document should be synchronized with metadata or content embedded in the document itself specifying the same attribute. Often documents in the CMS may be composed according to a particular XML grammar, and the XML markup of a given document includes the attributes to be synchronized with the CMS metadata maintained by the CMS.

Additionally, the CMS may allow users to define configuration rules for different document types. For example, a CMS may specify that documents of a given type should include a specified group of attributes. An attribute group may associate one or more attributes present in a document with one another. For example, an attribute group for a document type of "product description" could specify that each product description document should include an attribute value for "serial number" and "description." If an attribute group is defined that contains both of these attributes, then the CMS may assume that any given "product description" document contains the same number of "serial number" and "description" values. Thus, if a given product description document includes 3 serial numbers then it is assumed that there are also 3 descriptions.

However, a content processing rule (e.g., synchronization rule) may be configured to modify only one of these attributes. Further, an XML schema associated with the "product description" document could allow the content to have a differing number of values, i.e., the schema may not require a relationship between the "serial number" and the "description" attributes. In such a case, the CMS is unable to ensure that the attribute values in an attribute group are always of the same quantity. Embodiments of the invention may be used to validate content processing rules composed for a given document to prevent this type of conflict between document type definitions and content processing rules used by the CMS.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification promulgated by the International Conference on Harmonisation of Technical Requirements (ICH)). A given XML document may also be associated with additional artifacts such as a document type definition (DTD), XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of a computing environment 100, according to one embodiment of the invention. As shown, computing environment 100 includes a client computer system 110 and an administrator system 112 communicating with a server system 120 over a network 115. Of course, in another embodiment, the administrator system 112 could run on the same server system 120 as the content management system 130. Further, the computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer system 110 and administrator system 112 each include a CPU 102, storage 104, and memory 106 connected by a bus 111. CPU 102 is a programmable logic device that performs all the instructions, logic, and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by administrator system 112 may be coordinated by an operating system (not shown). Well known examples of operating systems include the Windows® operating system, distributions of the Linux® operating system, and IBM's OS/2® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer system 110 includes a client application 108, while memory 106 of administrator computer system 112 includes an administrator application. In one embodiment, client application 108 is a software application that allows users to access documents stored by a content management system (CMS) 130. Thus, client application 108 may be configured to allow users to create, edit, and save documents, e.g., word-processing documents, spreadsheets, database records, digital images or video data objects, to name but a few (collectively referred to as "documents") from CMS 130. Client application 108 may be configured to receive a document 117 from CMS 130 and store it in storage 104 while it is being accessed by client application 108. Similarly, administrator application 114 may be a software application configured to receive a content rule 119 from CMS 130 and store it in storage 104 while it is being accessed by administrator application 114. The administrator may use administrator application 114 to access existing content rules, edit existing content rules, and create new content rules for different groups of documents managed by CMS 130.

Content rule 119 may include any type of XML configuration file related to a particular XML document and other configuration files such as a DTD, schema, etc. Additionally, content rule 119 may include content processing rules performed by CMS 130 when documents flow into or out of repository 124, e.g., a rule synchronizing attributes of document content with data maintained by CMS 130 about the documents managed by CMS 130. When a new content rule is created by an administrator system 112, CMS 130 may be configured to validate the new content rule with respect to any related configuration files. This may ensure that an administrator does not create a rule that creates a conflict within the CMS between different configuration files.

As shown, server system 120 also includes a CPU 122, CMS storage repository 124, and a memory 126 connected by a bus 121. CMS repository 124 also includes a database 140 and file system 142. File system 142 typically provides access to a directory structure contained on a disk drive or network file system and may be used to store files (e.g., documents, XML fragments, and configuration sets managed by CMS 130). Database 140 may contain additional information and metadata related to documents stored in file system 142. Memory 126 of server system 120 includes CMS 130. CMS 130 provides an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130.

Content Rule Check-In

Figure 2:
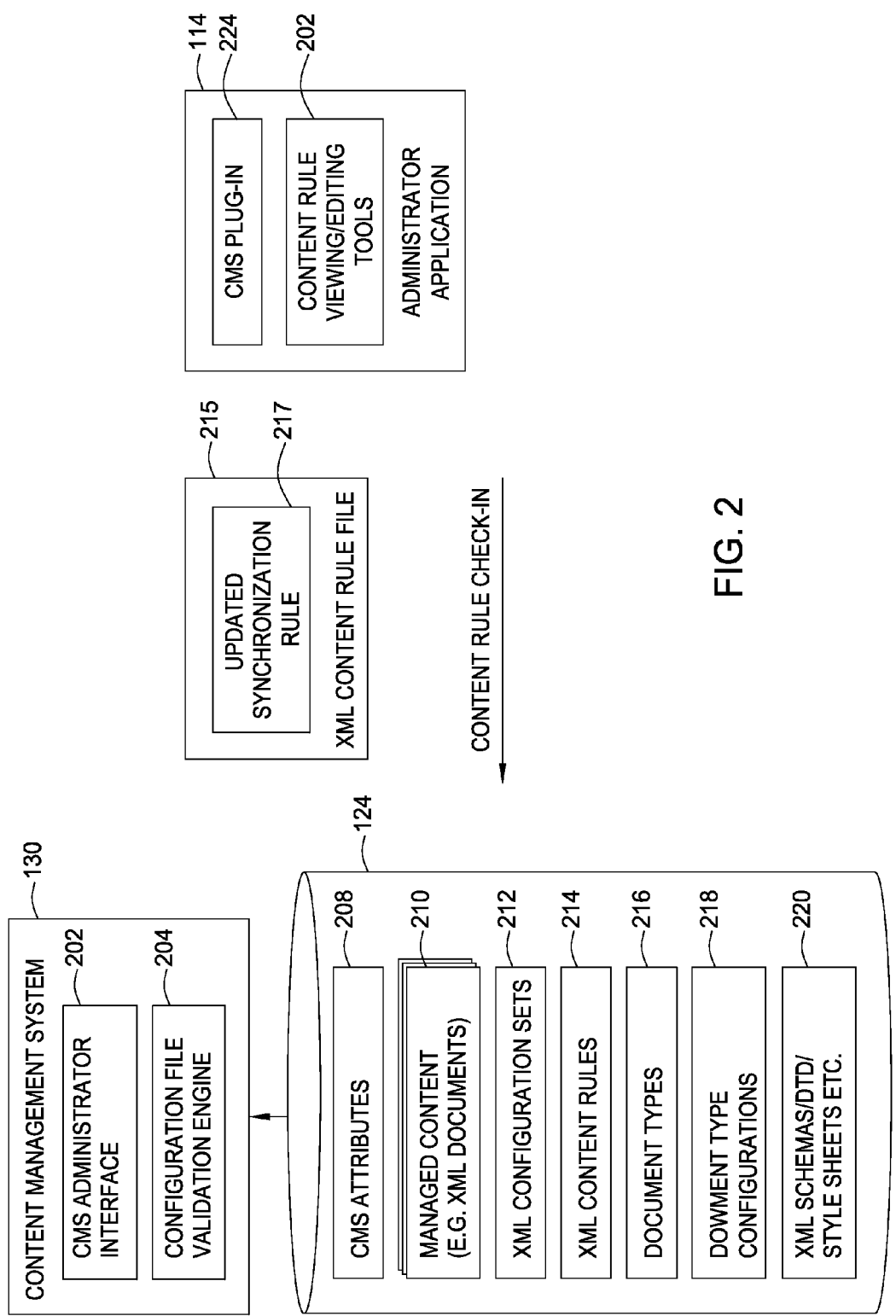
FIG. 2 is a conceptual illustration of an administrator application checking-in a content rule implemented by a CMS, according to one embodiment of the invention.

FIG. 2 is a conceptual illustration of administrator application 108 being used to check-in an XML content rule file 215, according to one embodiment of the invention. As shown, CMS 130 includes a CMS administrator interface 202 and a configuration file validation engine 204. Those skilled in the art will recognize that the CMS 130 illustrated in FIG. 2 is simplified to highlight aspects of the present invention and that CMS systems typically include a variety of additional elements not shown in FIG. 2.

Generally, administrator interface 202 provides an interface to the functionality of CMS 130, managed content 210 stored by database 140 and file system 142, and configuration files stored in the repository 124 such as XML content rules 214 and document type configurations 218. Thus, administrator interface 202 may provide an interface for checking in/out a content rule from CMS 130. The validation engine 204 represents a component of CMS 130 configured to validate a new or updated content rule to ensure that such a rule does not conflict with another related configuration file.

CMS attributes 208 represent any sort of stored metadata (e.g., a version or state) regarding some managed content (e.g., XML documents) 210 of CMS 130. For example, one or more database tables may be used to store a collection of attributes related to each document managed by CMS 130 (e.g., data related to managed content 210). CMS Attributes 208 may be referenced by multiple configuration files, such as content processing rules 214, document type configurations 218, so that the CMS 130 may manage the content related to the attributes 208 effectively and accurately.

In one embodiment, each configuration set 212 may include multiple configuration documents and rules relating to XML data management for a particular document type 216. That is, configuration sets 212 may provide a collection of configuration components related to a particular XML-based document type. For example, a configuration set 212 may contain components such as XML schemas, DTDs, stylesheets 220 and content rules 214. As is known, an XML schema/DTD defines the allowed content and structure for a given type of XML document. More specifically, XML schemas/DTDs provide rules specifying which elements (e.g., the markup tags) and attributes (i.e., values associated with specific tags) are allowed for a particular type of XML document, as well as rules regarding other elements of document structure. Content rules 214 may include processing rules performed by the CMS whenever a document of a particular document type flows into or out of the repository. For example, the CMS may maintain a set of attributes related to each document. In such a case, a content rule 214 may specify that a CMS attribute should be synchronized with content from a document of a given type, whenever created or checked in to the repository.

Additional configuration components, such as document type configurations 218, may store relationships specifying which configuration sets 212 are associated with a given document type or processing rule 214. In addition, CMS 130 may store a relationship between a given configuration set 212 and the individual documents that use that configuration set 212. This provides a tighter binding as opposed to relating a configuration set 212 only to a doctype which is more general and can encompasses several individual documents.

FIG. 2 also shows a content rule 215 being checked-in to CMS 130 by administrator application 114. Illustratively, content rule 215 contains an updated synchronization rule 217. When content rule 215 is checked-in, validation engine 204 may determine that content rule file 215 contains an updated synchronization rule 217 and validate synchronization rule 217 against any related configuration files, for example, one or more of the document type configurations 218. If the validation engine 204 detects a conflict, CMS 130 may be configured to warn the administrator via an administrator application 114. Further, in one embodiment, such a conflict may be automatically corrected by using additional schema constraints. As is known, schema constraints provide separate rules used in conjunction with a given XML schema to enforce constraints that XML schema, alone, cannot (e.g. ensuring that one element/attribute value correctly references another element/value by name, that particular values have a certain size or number of characters, etc). In one embodiment, the CMS 130 may prevent configuration conflicts by creating a schema constraint whenever a potential conflict exists between a document configuration set 218 (which may specify an attribute group requirement for a given document) and a processing rule (e.g., synchronization rule 217 in content rule file 215 which may specify a synchronization rule for one of the attributes included in the attribute group).

In one embodiment, administrator application 114 allows a system administrator to configure CMS 130 for general use, including configuring content rules 215 to specify processing actions to be performed when documents are checked into/out of CMS 130, e.g., a document-to-CMS attribute synchronization, or vice versa. Illustratively, administrator application 114 includes CMS plug-in 224 and content rule viewing/editing tools 226. CMS plug-in 224 allows administrator application 114 to interact with CMS 130 and CMS administrator interface 202. For example, plug-in 224 may allow an administrator interacting with administrator application 114 to check-in and check-out files (e.g., content rule file 215) from CMS 130. Thus, Content rule viewing/editing tools 226 provide the substantive features associated with a particular administrator application 114. Of course, the features provided by viewing/editing tools 226 may be tailored to suit the needs of an individual administrator application 114, such as managing/editing the content rules of CMS 130.

Configuration Conflict

Figure 3:
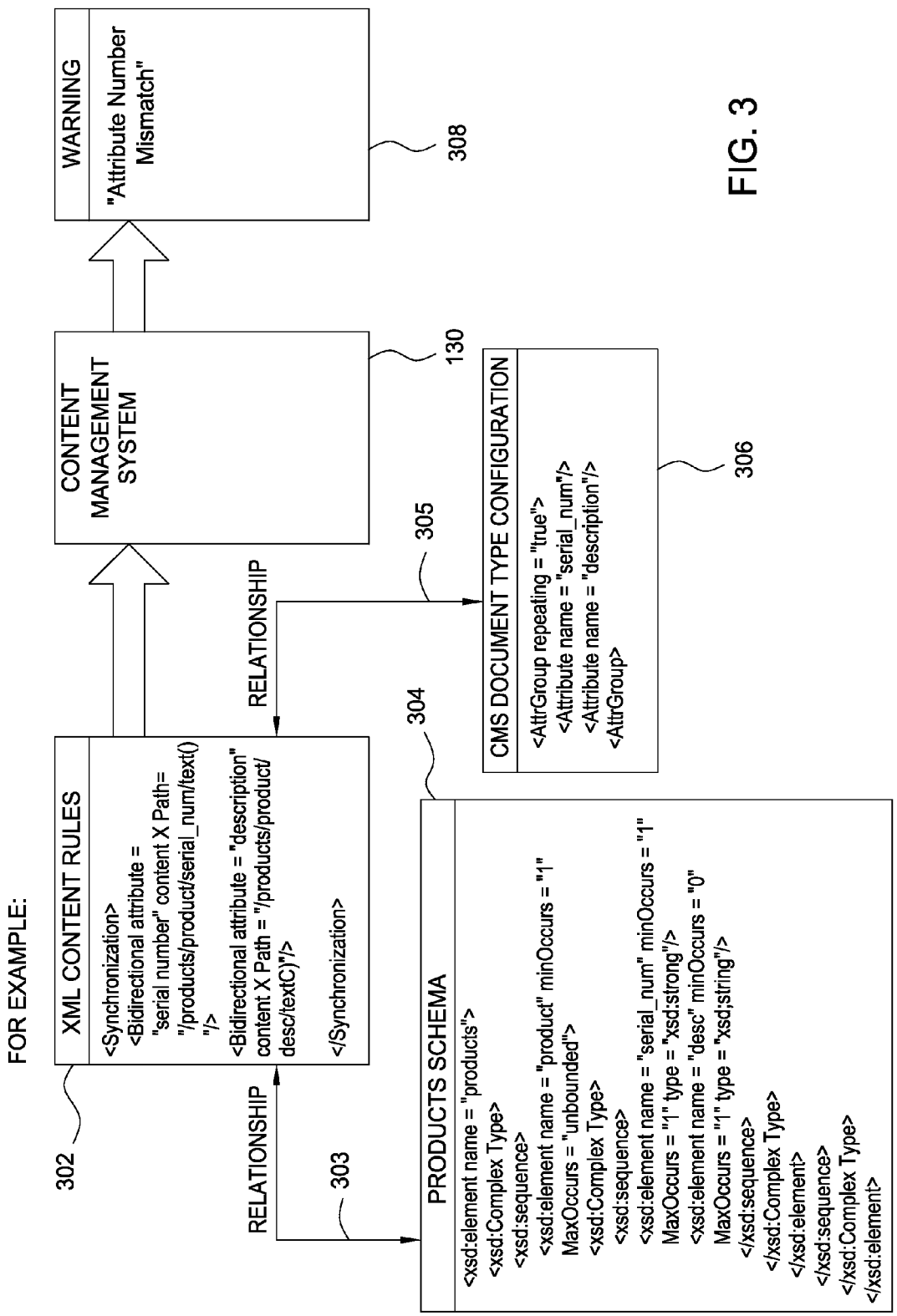
FIG. 3 illustrates a CMS evaluating an XML content rule file and its related configuration files to determine if there are conflicts, according to one embodiment of the invention.

FIG. 3 illustrates an example of CMS 130 evaluating a content processing rule, an XML schema, and a CMS document type configuration, according to one embodiment of the invention.

In this example, an administrator has checked-in content rule file 302 to CMS 130. Illustratively, content rule file 302 includes a synchronization rule. As shown, content rule file 302 has a relationship 303 to a products schema 304 and a relationship 305 to a CMS document type configuration 306. In this example, the synchronization rule synchronizes a CMS attribute of "serial_number" with content in a document identified by the Xpath expression "/products/product/serial_num/text( )" from a "product description" document. Similarly, the synchronization rule synchronizes a CMS attribute of "description" with content in a document identified by the Xpath expression "/products/product/description/text( )."

In addition to the XML content processing rules 302, a valid product description document is composed according to product schema 304. In this example, products schema 304 specifies that the element name "<serial-num>" has a "min_Occurs" value of 1 and a "max_Occurs" value of 1. Meaning that a product description document should contain exactly one occurrence of this element. Similarly, the element name "<desc>" has a "min_Occurs" value of 0 and a "max_Occurs" value of 1. Meaning that a product description document is not required to include any occurrence of this element.

However, CMS document type configuration 306 specifies an attribute group for product description documents. The attribute group is part of the CMS configuration files for documents of the "product description type." An attribute group may specify multiple document attributes that should occur with the same number of values in instances of that document type. In other words, document type configuration 306 specifies that a product description document should include an equal number of values for the serial number attribute as for its accompanying description attribute. For example, if there are three serial number attributes then there should also be three description attributes.

Accordingly, if CMS 130 accepted this content rule 302, the result may be that a client application 108 could be allowed to create or access a document that is invalid relative to the CMS document type configuration 306, even though valid relative to the XML configuration set and XML schema associated with this document type. For example, client application 108 may create a document that contains one serial number but no description.

In one embodiment, CMS 130 may address this problem by evaluating the complete collection of configuration files associated with content rule 302, including CMS document type configuration 306. CMS 130 may determine what configuration files include the CMS attribute referenced by the synchronization rule contained within content rules 302. As a result, CMS 130 may determine that there is a conflict between the document type configuration 306 and schema 304 related to the updated content rules 302.

Upon determining that there is a conflict, CMS 130 may be configured to return a warning 308 to the administrator application 114 checking-in the content rules 302 indicating the conflict between the configuration files. In one embodiment, CMS 130 may be configured to allow the check-in to proceed after having alerted the administrator application, leaving it to the discretion of the administrator to resolve the conflict. In another embodiment, CMS 130 may be configured to return a warning to the administrator application and prevent the updated configuration file from being checked-in until the conflict is resolved. Further, CMS 130 may be configured to alert the administrator and correct the conflict. For example, in one embodiment, the CMS 130 may create a schema constraint whenever there is a potential conflict between an attribute group requirement for a given document and a synchronization rule 217 in content rule file 215.

Figure 4:
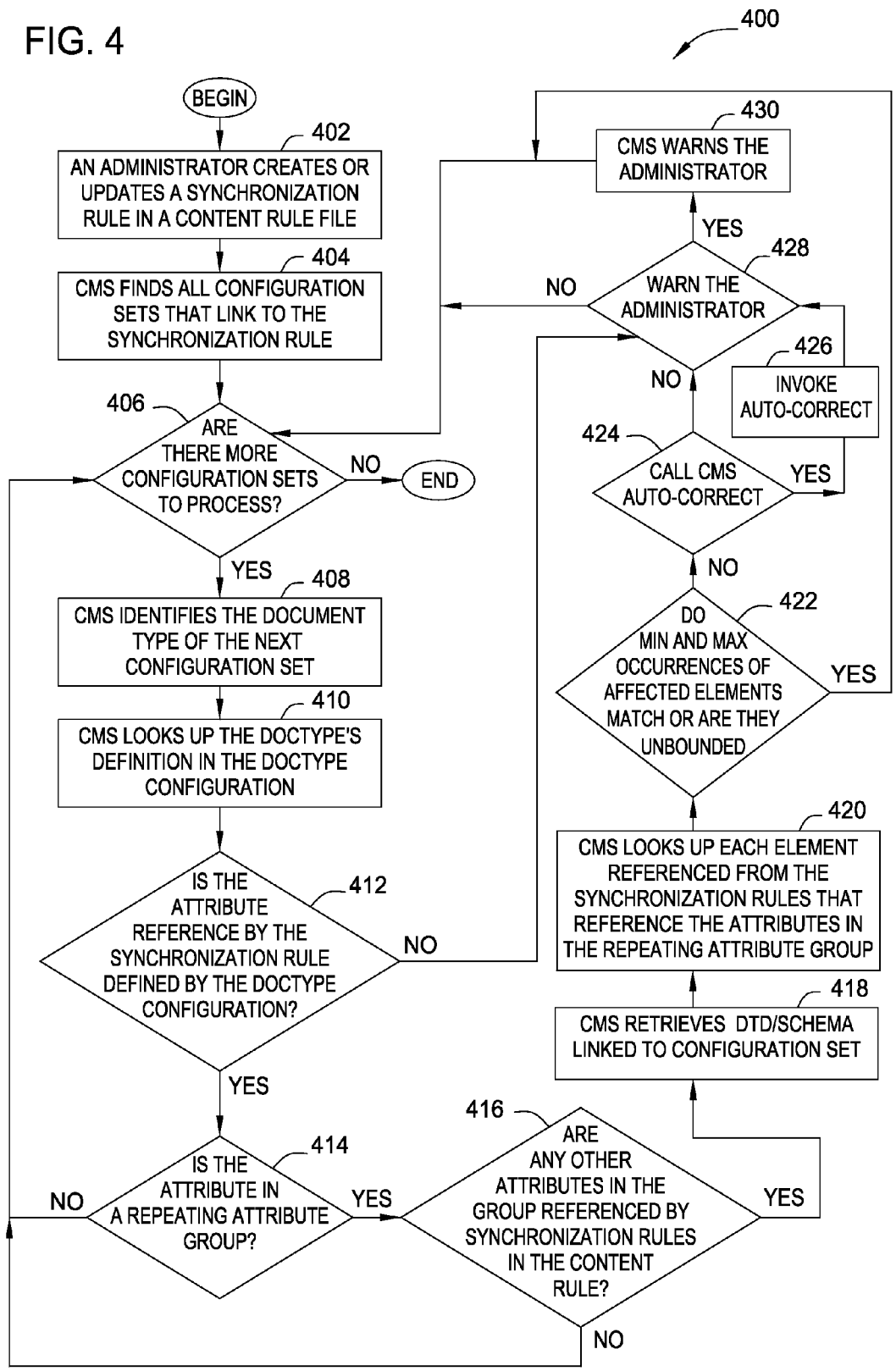
FIG. 4 is a flow diagram illustrating a method for detecting and correcting configuration conflicts between configuration files, according to one embodiment of the invention.

FIG. 4 is a flow diagram illustrating a process 400 for detecting and correcting configuration conflicts between related configuration files, according to one embodiment of the invention. As shown, process 400 begins at step 402 where an administrator creates or updates a synchronization rule contained within a content rule file. In response, CMS 130 may be configured to detect whether the synchronization rule references a CMS attribute that is part of a repeating attribute group.

At step 404, CMS 130 may identify each configuration set that links to the content rule file being checked-in. As stated, a configuration set may include a collection of artifacts (e.g., an XML schema, DTD, stylesheets, XSLTs, etc). Further, the same configuration set may be associated with multiple document types, allowing the same collection of artifacts to be reused where appropriate.

At step 406 a loop begins where CMS 130 evaluates each configuration set identified at step 404. Once each configuration set is evaluated then process 400 terminates. In each pass through the loop one of the configuration sets identified at step 404 may be evaluated. At step 408, CMS 130 identifies a CMS document type corresponding to the particular XML configuration set being evaluated (i.e., one of the configuration sets identified at step 404). Based on the document type, at step 410, CMS 130 looks up the doctype's definition to determine if the CMS attribute referenced by the synchronization rule received at step 402 is defined by that doctype. At step 412, if the attribute referenced in the synchronization rule is not defined by the doctype, then CMS 130 may send a warning to the administrator that the particular attribute referenced by a synchronization rule is not defined by an associated doctype (step 428).

Otherwise, at step 414, CMS 130 determines whether the CMS attribute referenced by the synchronization rule is defined by the doctype, then the CMS 130 may determine whether the CMS attribute is part of a repeating attribute group (also defined by an the document type configuration). If not, then there is not a risk of a conflict as the attribute referenced in the synchronization rule is not part of a repeating group, and process 400 returns to step 406 to evaluate the next configuration set.

However, if the CMS attribute is part of a repeating attribute group, then CMS 130 evaluates the same set of XML content rules being editing/checked in by the administrator to determine whether any other attributes in the attribute group are referenced by other synchronization rules. If not, then there is not a risk of a conflict between the synchronization rule and the attribute group, and process 400 returns to step 406 to evaluate the next configuration set.

At step 416, however, if CMS 130 determines that attributes in the repeating attribute group are referenced by other synchronization rules, then such a configuration set is implicitly related to the attribute group (as more than one attribute in the group is referenced by more than one synchronization rule from the configuration set). Process 400 proceeds to step 418 where CMS 130 retrieves the DTD/schema associated with the configuration set being evaluated. For each identified XML configuration set implicitly related to the attribute group (as described above), the CMS retrieves the DTD/schema that is linked into the XML configuration set.

At step 420, CMS 130 may identify within the DTD/schemas, each XML element that is referenced from the same synchronization rules that reference the CMS attributes in the repeating attribute group. In one embodiment, CMS 130 ensures that each XML element/attribute corresponding to each CMS attribute defined by the repeating attribute group has an equal number of possible values, regardless of any processing that may be performed by the synchronization rules. If the minimum or maximum occurrences of affected elements match, then process 400 proceeds to step 406 to evaluate the next configuration set.

If however, the minimum or maximum occurrences of affected elements do not match or are unbounded then process 400 proceeds to step 424 where CMS 130 determines if there is a policy available to correct the conflict. In one embodiment, the policy may specify that extra schema constraints should be generated by the CMS to ensure that the number of values for affected elements always remain the same.

For example, FIG. 3 shows an XML schema where one element has a minimum occurrence of "0" while the other element has a minimum occurrence of "1." In another case, the minimum and maximum occurrences may be ambiguous (i.e. minimum and maximum occurrences are "unbounded"). In such a case, the policy may specify to dynamically alter the external schema validation rules with an additional schema constraint to ensure that the number of occurrences for the associated elements matches.

If CMS 130 determines that there is a policy for automatically correcting a conflict, then at step 426 the policy is invoked to correct the conflict. As stated, for example, the CMS 130 may dynamically alter the external schema validation rules (i.e. extra schema constraints) to ensure that the number of occurrences for the associated elements matches. At step 428, CMS 130 may send a warning message to the administrator to alert the administrator of the dynamic changes made to the configuration files.

If however, CMS 130 determines at step 428 that the policy specifies to send a warning message to the administrator, process 400 proceeds to step 430 where CMS 130 returns a warning to the administrator. The warning could indicate that a particular attribute referenced by a synchronization rule is not defined by an associated doctype, or that there is a mismatch in the number of element values related to an attribute group. The administrator may want to change the schema manually to make sure that the attribute group remains valid or may want to change the attribute group definition within the document type configuration (e.g. if the schema is immutable). The warning could be in the form of an email or a simple warning dialog as the administrator is editing the XML content rules. Further, the system could prevent the administrator from checking in the XML content rule until the conflict is resolved.

Advantageously, embodiments of the invention assist CMS administrators tasked with managing several related XML configuration components. Namely, embodiments of the invention reduce the amount of manual work required to manage the relationships between multiple loosely coupled components in the system by providing a conflict detection process and a means for automatically correcting the problems via a policy.

While the foregoing is directed to embodiments of the present invention, other and further embodiments of the invention may be devised without departing from the basic scope thereof, and the scope thereof is determined by the claims that follow.

What is claimed is:

1. A method for detecting configuration conflicts between configuration files in a content management system (CMS), comprising:
   storing a configuration set associated with one or more documents managed by the CMS, wherein each document of the one or more documents has a corresponding document type;
   receiving a content processing rule to be applied to one or more documents, wherein the content processing rule defines an operation to be performed by the CMS whenever a document of a document type specified by the content processing rule is checked-in to or checked-out from the CMS, and wherein the operation to be performed by the CMS includes, at least in part, modifying at least one document attribute in the one or more documents;
   determining that the at least one document attribute referenced by the content processing rule is a member of a repeating attribute group specified by a document type configuration associated with the document type specified in the content processing rule, wherein the repeating attribute group specifies a plurality of document attributes that should occur with the same number of values in instances of the document type;
   upon determining that, when applied to a first instance of the document type, the content processing rule could modify the first instance of the document type to include a differing number of values for the plurality of document attributes specified in the repeating attribute group, notifying a system administrator;
   generating an external schema validation rule configured to ensure that a number of occurrences of the plurality of document attributes in the first instance of the document type matches the number of occurrences of the plurality of document attributes in the modified first instance of the document type; and
   accepting the received content processing rule, whereby the operation defined by the content processing rule will be performed by the CMS whenever documents of the document type associated with the content processing rule are checked-in to or checked-out of the CMS.

2. The method of claim 1, wherein the configuration set includes a collection of XML artifacts, including at least one of an XML schema, document type definition (DTD), XML stylesheet, and XSLT transform.

3. The method of claim 1, wherein the content processing rule is a synchronization rule specifying metadata maintained by the CMS to synchronize with metadata contained in documents of the document type whenever documents of the document type are checked-in to or checked-out from the CMS.

4. The method of claim 3, wherein the metadata contained in documents of the document type comprises an XML attribute.

5. The method of claim 1, wherein the external schema validation rule is an XML schema constraint.

6. A computer-readable storage device containing a program which, when executed, performs an operation for detecting configuration conflicts between configuration files in a content management system (CMS), the operation comprising:
   storing a configuration set associated with one or more documents managed by the CMS, wherein each document of the one or more documents has a corresponding document type;
   receiving a content processing rule to be applied to one or more documents, wherein the content processing rule defines an operation to be performed by the CMS whenever a document of a document type specified by the content processing rule is checked-in to or checked-out from the CMS, and wherein the operation to be performed by the CMS includes, at least in part, modifying at least one document attribute in the one or more documents;
   determining that the at least one document attribute referenced by the content processing rule is a member of a repeating attribute group specified by a document type configuration associated with the document type specified in the content processing rule, wherein the repeating attribute group specifies a plurality of document attributes that should occur with the same number of values in instances of the document type;
   upon determining that, when applied to a first instance of the document type, the content processing rule could modify the first instance of the document type to include a differing number of values for the plurality of document attributes specified in the repeating attribute group, notifying a system administrator;
   generating an external schema validation rule configured to ensure that a number of occurrences of the plurality of document attributes in the first instance of the document type matches the number of occurrences of the plurality of document attributes in the modified first instance of the document type; and
   accepting the received content processing rule, whereby the operation defined by the content processing rule will be performed by the CMS whenever documents of the document type associated with the content processing rule are checked-in to or checked-out of the CMS.

7. The computer-readable storage device of claim 6, wherein the configuration set includes a collection of XML artifacts, including at least one of an XML schema, document type definition (DTD), XML stylesheet, and XSLT transform.

8. The computer-readable storage device of claim 6, wherein the content processing rule is a synchronization rule specifying metadata maintained by the CMS to synchronize with metadata contained in documents of the document type whenever documents of the document type are checked-in to or checked-out from the CMS.

9. The computer-readable storage device of claim 8, wherein the metadata contained in documents of the document type comprises an XML attribute.

10. The computer-readable storage device of claim 6, wherein the external schema validation rule is an XML schema constraint.

11. A system, comprising:
a processor; and
a memory containing a content management system (CMS) program configured to detect configuration conflicts between configuration files in the CMS by performing the steps of:
storing a configuration set associated with one or more documents managed by the CMS, wherein each document of the one or more documents has a corresponding document type;
receiving a content processing rule to be applied to one or more documents, wherein the content processing rule defines an operation to be performed by the CMS whenever a document of a document type specified by the content processing rule is checked-in to or checked-out from the CMS, and wherein the operation to be performed by the CMS includes, at least in part, modifying at least one document attribute in the one or more documents;
determining that the at least one document attribute referenced by the content processing rule is a member of a repeating attribute group specified by a document type configuration associated with the document type specified in the content processing rule, wherein the repeating attribute group specifies a plurality of document attributes that should occur with the same number of values in instances of the document type;
upon determining that, when applied to a first instance of the document type, the content processing rule could modify the first instance of the document type to include a differing number of values for the plurality of document attributes specified in the repeating attribute group, notifying a system administrator;
generating an external schema validation rule configured to ensure that a number of occurrences of the plurality of document attributes in the first instance of the document type matches the number of occurrences of the plurality of document attributes in the modified first instance of the document type; and
accepting the received content processing rule, whereby the operation defined by the content processing rule will be performed by the CMS whenever documents of the document type associated with the content processing rule are checked-in to or checked-out of the CMS.

12. The system of claim 11, wherein the configuration set includes a collection of XML artifacts, including at least one of an XML schema, document type definition (DTD), XML stylesheet, and XSLT transform.

13. The system of claim 11, wherein the content processing rule is a synchronization rule specifying metadata maintained by the CMS to synchronize with metadata contained in documents of the document type whenever documents of the document type are checked-in to or checked-out from the CMS.

14. The system of claim 13, wherein the metadata contained in documents of the document type comprises an XML attribute.

15. The system of claim 11, wherein the external schema validation rule is an XML schema constraint.

* * * * *